(12) United States Patent
Farmer et al.

(10) Patent No.: US 10,647,064 B2
(45) Date of Patent: May 12, 2020

(54) SYSTEM AND METHOD FOR LIGHT ASSISTED FRICTION STIR PROCESSING AND WELDING OF METALLIC AND NON-METALLIC MATERIALS

(71) Applicants: Joseph C. Farmer, Tracy, CA (US); Alexander M. Rubenchik, Livermore, CA (US); Raymond J. Beach, Livermore, CA (US); Robert J. Deri, Pleasanton, CA (US); Edward I. Moses, Livermore, CA (US); Bassem S. El-Dasher, Livermore, CA (US); Sarath K. Menon, Monterey, CA (US); Terry McNelley, Monterey, CA (US)

(72) Inventors: Joseph C. Farmer, Tracy, CA (US); Alexander M. Rubenchik, Livermore, CA (US); Raymond J. Beach, Livermore, CA (US); Robert J. Deri, Pleasanton, CA (US); Edward I. Moses, Livermore, CA (US); Bassem S. El-Dasher, Livermore, CA (US); Sarath K. Menon, Monterey, CA (US); Terry McNelley, Monterey, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 604 days.

(21) Appl. No.: 14/360,570

(22) PCT Filed: Oct. 16, 2012

(86) PCT No.: PCT/US2012/060395
§ 371 (c)(1),
(2) Date: May 23, 2014

(87) PCT Pub. No.: WO2013/081731
PCT Pub. Date: Jun. 6, 2013

(65) Prior Publication Data
US 2014/0318685 A1    Oct. 30, 2014

Related U.S. Application Data

(60) Provisional application No. 61/565,753, filed on Dec. 1, 2011.

(51) Int. Cl.
*B29C 65/72* (2006.01)
*B23K 20/12* (2006.01)
(Continued)

(52) U.S. Cl.
CPC .......... *B29C 65/72* (2013.01); *B23K 20/1245* (2013.01); *B23K 31/02* (2013.01);
(Continued)

(58) Field of Classification Search
CPC .......... B29C 65/00; B29C 65/70; B29C 65/72; B29C 65/06; B23K 20/00; B23K 20/10;
(Continued)

(56) References Cited

U.S. PATENT DOCUMENTS 7,156,277 B2    1/2007   Ishikawa et al.
7,568,608 B1 *  8/2009   Ding ..................... B23K 20/10
                                                   228/1.1

(Continued)

FOREIGN PATENT DOCUMENTS

JP      2006088208 A    4/2006
WO        9939861 A1    8/1999

*Primary Examiner* — Jacob T Minskey
*Assistant Examiner* — Matthew Hoover
(74) *Attorney, Agent, or Firm* — Harness, Dickey & Pierce, P.L.C.

(57) ABSTRACT

An apparatus for use in a friction stir operation, such as friction stir welding (FSW) or friction stir processing (FSP). The apparatus may have a rotating tool adapted to be
(Continued)

plunged into a material, where the material is susceptible to being softened by heating. The rotating tool may further be adapted to be advanced along a surface of the material. An optical energy generating subsystem may be used to heat a portion of the material using optical energy as the tool is advanced along the material.

21 Claims, 4 Drawing Sheets

(51) Int. Cl.
    *B23K 31/02*          (2006.01)
    *B29C 65/06*          (2006.01)
    *B23K 101/18*         (2006.01)
    *B23K 103/10*         (2006.01)

(52) U.S. Cl.
    CPC .......... *B29C 65/06* (2013.01); *B23K 2201/18* (2013.01); *B23K 2203/10* (2013.01)

(58) Field of Classification Search
    CPC ...... B23K 20/12; B23K 20/12; B23K 20/124; B23K 20/124; B23K 20/1245; B23K 31/00; B23K 31/02
    See application file for complete search history.

(56) References Cited

U.S. PATENT DOCUMENTS

| 2003/0116608 A1* | 6/2003 | Litwinski | B23K 20/1235 228/112.1 |
| 2003/0205565 A1* | 11/2003 | Nelson | B29C 65/0672 219/148 |
| 2004/0020970 A1* | 2/2004 | Palm | B23K 20/1235 228/112.1 |
| 2004/0050906 A1* | 3/2004 | Rice | B23K 20/1235 228/112.1 |

* cited by examiner

SYSTEM AND METHOD FOR LIGHT ASSISTED FRICTION STIR PROCESSING AND WELDING OF METALLIC AND NON-METALLIC MATERIALS

CROSS-REFERENCE TO RELATED APPLICATIONS

This application claims the benefit of U.S. provisional patent application Ser. No. 61/565,753, filed Dec. 1, 2011. The disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to friction stir welding and processing systems and methods, and more particularly to a system and method for friction stir welding and processing that makes use of optical energy to pre-heat the material being acted on to a temperature which is close to the softening temperature of the material, to thus increase the processing rate and improve a weld being made on the material.

BACKGROUND

The statements in this section merely provide background information related to the present disclosure and may not constitute prior art.

In conventional friction stir welding (FSW) and friction stir processing (FSP), a rotating cylindrical tool is first plunged into the material to be processed or welded. Typically the material is a metallic material, though it may be possible to apply this to plastics, glasses, ceramics, and combinations thereof. The rotating cylindrical tool is then advanced horizontally along the surface of the material. In the case of FSW, the rotating tool is advanced along a butt joint between two abutting pieces or sections of the material to be joined. The rotating motion of the cylindrical tool and the heat generated in the material literally stirs material from both sides of the joint together, thereby producing a solid-state weld between the two pieces of material. This produces a joint between the materials that has superior material properties. In the case of FSP, the stirring causes the refinement of grains in the material and eliminates the porosity and voids in castings. In both FSW and FSP operations, frictional heat is generated between the tool and the welded material, which softens the material. Softening of the material below its melting point enables it to flow around the advancing, rotating tool.

FSW is an attractive solid-state joining process that can be performed in air and used to make very long joints in aluminum sheets used for constructing large structures with complex shapes, such as aircraft wings and fuselages. FSW can also be used for joining oxide dispersion strengthened (ODS) ferritic-martensitic (FM) steels that may be required for advanced nuclear reactor applications in the future. ODS FM steels are preferred for such applications since they have been shown to have exceptional high-temperature strength, high-temperature creep resistance, and resistance to radiation-induced swelling and creep. Unfortunately, conventional welding processes that require melting within the weld zone enable the $Y_2O_3$ nanodispersoid to phase separate from the molten metal, literally floating out of the weld zone. These particles can also agglomerate. This can result in a weakened weld after solidification. FSW avoids, or at least significantly mitigates, such problems.

It will thus be appreciated that FSW provides a solid-state joining process which has significant benefits and advantages over conventional fusion welding processes. By avoiding the formation of any liquid phase during processing, ODS FM steels can be joined without the loss of oxide particles from the weld, which typically lead to a weakened joint under some of the extreme operating conditions of interest. This solid-state process also enables the repair of high strength steels underwater, and the joining of aluminum and titanium under atmospheric conditions.

In spite of the foregoing advantages of FSW, FSW still has challenges to overcome. For example, an insufficient weld temperature can produce long tunnel-like imperfections (tunnel defects) in the weld that are difficult to detect, even with non-destructive evaluation (NDE) techniques. Therefore, there is still a need to better control the temperature of the material in the weld to significantly reduce or eliminate such long tunnel-like imperfections that may result from an insufficiently high material temperature at the weld joint.

FSP of nickel-aluminum bronze (NAB), which is used for propeller castings, has been shown to substantially improve the grain structure of the alloy and to dramatically improve the passive film stability on this complicated multi-phase alloy. NAB consists of a matrix of solid-solution alpha ($\alpha$) phase ($k_{ii}$, $k_{iii}$ and $k_{iv}$) and a finer and more complicated structure dispersed within this matrix, consisting of iron-aluminum intermetallics, known as the kappa ($k_{ii}$, $k_{iii}$ and $k_{iv}$) phase (Farmer et al., "*Studies of Passive Films on Friction Stir Processed and Laser Peened NiAl Bronze, Corrosion Resistant Metal Allows III,* 2011," Department of Defense Corrosion Conference, Jul. 31-Aug. 5, 2011, Palm Springs, Calif., NACE Paper 20194, National Association of Corrosion Engineers, Houston, Tex., 2011).

Unfortunately, the stress and wear experienced by FSW and FSP tools can shorten their service life, cause contamination of the welded or processed material with material lost from the rotating tool, and increase the cost per linear foot of weld produced, or the cost per square foot of surface processed. Each tool is quite expensive, costing approximately $3,000-$10,000 (US). If such a conventional FSW tool fails after about 75 meters (246 feet) of welding, which is the approximate maximum distance before failure observed by the inventors, then the cost per linear foot for tool replacement would be approximately $12-$41 per linear foot. This cost does not account for any of the other costs associated with the process, such as the cost associated with down-time needed to replace the tool. At the present time, a more realistic estimate for the total cost of friction stir welding, or friction stir processing is approximately $100-$1000 per foot.

Clearly, anything that can be done which cost effectively enhances the longevity of a tool used in a FSW or FSP operation would be highly desirable and valuable. Furthermore, anything that can be done to ensure that the temperature of the material being welded or processed is sufficiently high so as to maintain that material in a softened state, thereby enabling more facile flow around the advancing rotating tool is highly desirable, and commercially valuable.

Previous efforts to enhance the longevity of the tool have centered around preheating the material to be welded. This could be done using by placement of a localized heat source in front of the tool on the tool path, such as a laser [Palm, "Laser supported friction stir welding method." U.S. Pat. No. 6,793,118. September 2004] or a flat induction coil [West et al., *Microstructure and Mechanical Properties of Friction Stir Processed Grade* 40 *Grey Cast Alloy*", Friction Stir Welding and Processing VI, edited by R. Mishra, M. W. Mahoney, Y. Sato, Y. Hovanski, and R. Verma, The Minerals, Metals & Materials Society, Pub. Wiley and Sons, Hoboken, N.J., 2011], or an electric arc [Kou, S., and Cao, G. "Arc-enhanced friction stir welding." U.S. Pat. No. 7,078,647. July 2006].

In addition to a potentially sizeable back-end for high power lasers, the laser heating method requires a focused beam which can create hot spots in the region in front of the tool on the tool path, thereby affecting the load on the tool and hence the quality of the weld.

The use of flat induction coils is limited to magnetic materials, as the coil sits near the surface and does not surround the work-piece, and so can only affect it via magnetic hysteresis (as opposed to eddy currents). Furthermore, the coil needs to be in near intimate contact with the surface of the work piece, something that is not always possible (e.g. complex geometries). This limitation also exists for arc-assisted FSW and FSP.

SUMMARY

One aspect of the present disclosure relates to an apparatus for use in a friction stir operation, such as friction stir welding (FSW) or friction stir processing (FSP). The apparatus may have a rotating tool adapted so that it can be plunged into a material, where the material is susceptible to being softened by heating. The rotating tool may further be adapted so that it can be advanced along a surface of a single material, or along a butt joint formed between two adjacent, mated pieces of material that are to be joined. An optical energy generating subsystem may be used to heat a portion of the material using optical energy as the tool is advanced along the material. For example, intense diode arrays with microlenses and microchannel heat exchangers can be used for heating. These arrays can be placed in front of the advancing tool, beneath the advancing tool, heating the work piece from the side opposite the FSW or FSP tool, or behind the advancing tool to control the cooling rate, and any associated grain growth or recrystallization.

In another aspect the present disclosure relates to an apparatus for use in at least one of a friction stir welding (FSW) and a friction stir processing (FSP) operation. The apparatus may comprise a rotating tool adapted to be plunged into a material susceptible to being softened by heating. The rotating tool may further be adapted to be advanced along a surface of the material. A diode array may be included which has at least one light emitting diode. The diode array may be supported from the apparatus adjacent the surface of the material and adjacent the rotating tool. The diode array may be controlled to heat a portion of the material using optical energy at least one of prior to, or subsequent to, the material being acted on by the rotating tool.

In still another aspect the present disclosure relates to a method of performing a friction stir operation. The method may comprise plunging a rotating tool into a material being worked on. Optical energy may be used to heat and soften a select portion of the material at least one of prior to, or subsequent to, the material being worked on by the rotating tool.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a simplified schematic side view of a laser diode array with a direct coupled, flexible fiber optic element that receives the optical output from the laser diode array and directs the output to the surface of materials being worked on.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
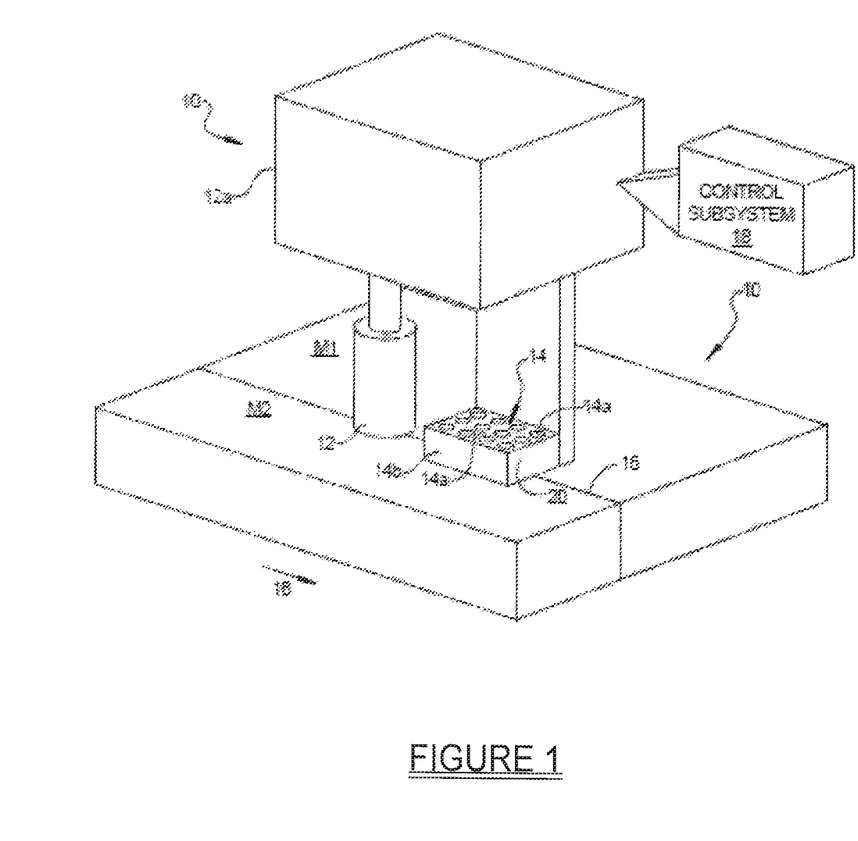
FIG. 1 is a high level diagram of one embodiment of a rotating friction stir welding (FSW) or friction stir processing (FSP) tool in accordance with the present disclosure, with the tool being used to join two pieces of material being together, and further illustrating an optical energy generating subsystem, in this example a diode array, which is used to pre-heat and pre-soften the materials at the joint area ahead of the tool relative to the direction of movement of the tool.

Referring to FIG. 1, there is shown one embodiment of a friction stir welding ("FSW") or friction stir processing ("FSP") system 10 in accordance with the present disclosure. It will be appreciated that the system 10 is equally applicable to FSW or FSP implementations. The terms FSW and FSP may be referred to collectively herein as "friction stir operations".

The system 10 may include a tool 12 suitable for a FSW or FSP operation that is rotated at a relatively high rotation speed while being moved through the material being joined or processed. For example, in the case of aluminum alloys, a typical rotation speed may be on the order of about 200 to 1000 rpm, and more typically between about 800 rpm-1000 rpm. The tool 12 may be tilted at an angle of approximately 2.5 to 3.0° relative to the surface normal, and moved through the material being worked on at a desired rate. Typical rates may range from 100 to 400 millimeters per minute. Of course, lower and greater speeds are possible. See, for example, Y. C. CHEN, H. J. LIU, J. C. FENG, National Key Laboratory of Advanced Welding Production Technology, Harbin Institute of Technology, Harbin 150001, People's Republic of China, *Effect of post-weld heat treatment on the mechanical properties of 2219-O friction stir welded joints*, Journal Of Materials Science 41 (2006) 297-299 LETTERS; and Y. Uematsu, Y. Tozaki, K. Tokaji, and M. Nakamura, *Fatique Behavior Of Dissimilar Friction Stir Welds Between Cast And Wrought Aluminum Alloys*, Strength of Materials, Vol. 40, No. 1, 2008, both of which are hereby incorporated by reference into the present document.

The system 10 may also include at least one optical energy generating subsystem 14 which is supported adjacent to the tool 12 so that it is able to pre-heat, and thus pre-soften, a portion of the joint area 15 of materials M1 and M2 as the tool 12 and the optical energy generating subsystem 14 are moved along the joint area 15. In this regard it will be appreciated that the tool 12 and the optical energy generating subsystem 14 may be supported from a common structure or frame-like support 12a, with the subsystem 14 positioned ahead of the tool 12 relative to the direction of movement of the tool 12. In this example arrow 16 indicates the direction of movement of the tool 12. A control subsystem 18 may be used to control various aspects of the system such as the rotation of the tool 12, translational movement of the tool 12, as well as operation of the optical energy generating subsystem 14. Such operation of the optical energy generating subsystem 14 may involve on/off operation as well as potentially controlling the intensity of the optical output from the subsystem 14 to tailor the output for different types of materials. Alternatively, separate control subsystems could be employed for controlling the optical energy generating subsystem 14 and rotational/translational movement of the tool 12.

It will be appreciated that the system 10 can be used to weld and process not only various types of metals, but potentially also ceramics, plastics and other types of materials. Virtually any other materials that are susceptible to be joined or processed by a heat-induced action may potentially be worked on using the system 10.

The tool 12 itself may be constructed from any suitable material or combination of materials, including but not limited to polycrystalline cubic boron nitride (PCBN) commonly used for FSW and FWP applications. Still other materials, such as the iron based amorphous metals (SAM2X5 and SAM1651 as the abrasive dispersed phase in W—Re binder phase) could be used as well. Such amorphous metals are close in composition to stainless steels, have extreme hardness values (1100-1300 on Vickers scale) and would not contaminate welds in other stainless-type materials. It may also be possible to use nanodiamond and other such materials in the construction of the tool 12. However, it will be appreciated that the precise composition of materials used for the tool 12 may vary significantly depending on materials the tool 12 is being used to work on and the desired durability or life span that one desires for the tool.

In one specific embodiment the optical energy generating subsystem 14 comprises an assembly of light emitting laser diode bars 14a forming a diode array 14b which is supported on, or within, a suitable enclosure 20. All of the laser diode bars 14a may be energized simultaneously or sub-portions of the laser diode bars 14a may be selectively energized at different times. The enclosure 20 is supported such that it is close to the surface of the joint area 15, and typically within about 5 mm-30 mm from the surface of the materials M1 and M2, though other standoff distances are possible. In practice, it will be appreciated that this standoff distance may be tailored as needed depending on the specific material being joined, the speed at which the FSW/FSP tool is being moved, and other factors. The precise distance of the diode array 14b from the surface of the materials M1/M2 will also depend in part on the intensity of the optical energy emitted from the diode array 14b.

The precise number of laser diode bars 14a of the diode array 14b required to generate the needed amount of optical energy may also vary considerably depending on the specific type(s) of material(s) being worked, the speed at which one desires the rotating tool 12 to be translated along the materials M1/M2 and other factors. However, it is anticipated that in many applications, anywhere from 50-100 laser diode bars, to possibly several thousand or more laser diode bars, may be required to generate sufficient optical energy to pre-heat and pre-soften the material being worked on.

One specific laser diode array configuration that is particularly suitable for use with the present system uses laser diode bars that have their optical outputs conditioned by cylindrical microlenses. The purpose of the microlenses is to collimate the output radiation of the individual laser diode bars that comprise the array in at least one dimension, which then enables easier manipulation of the array's output radiation. Such arrays were introduced by Lawrence Livermore National Laboratory (LLNL) in the early 1990s (see R J Beach, M A Emanuel, B L Freitas, J A Skidmore, N W Carlson, W J Benett, R W Solarz, "Applications of Microlens-Conditioned Laser Diode Arrays," SPIE Vol. 2383 pp. 283-297, May 1995). These arrays permitted much higher irradiances to be developed at a work piece than were previously possible via a simple focusing lens in front of the array. By the mid 1990's preliminary experimental material processing investigations using such large 2-d laser diode arrays (with radiance conditioning microlenses) were being conducted (see S. Pflueger, F. Kueppere, A. Bartels and R. J. Beach, "Using High-Power Laser Diodes in Material Processing", The Fabricator, pp. 52-54, October 1995). Such systems are today commercially available from multiple vendors, the new High Power D Series diode array from Coherent Inc., being a specific example of a multi kW direct diode laser system for material processing. A variation of the forgoing system that is particularly suitable for use with the present system incorporates a simple condensing lens or a non-imaging optical elements after the microlens-conditioned diode array to collect and condense the light for the diode array before delivery to the work piece. One such commonly used non-imaging optical ducting device is a lens duct (see Beach, R. J., "Theory and Optimization of Lens Ducts," Applied Optics, 35(12): p. 2005-2015, 1996; and M Eichhorn, "Theory and Optimization of hollow ducts," Applied Optics 47 pp. 1740-1744, 2008).

In contrast with various other methods for pre-heating, such as localized induction heating or high intensity infrared lamps, diode arrays are known for their exceptionally high electrical-to-light conversion efficiency. For example, diodes can convert electrical energy to the light used to heat the joint area 15, often with an efficiency in excess of fifty percent. This is substantially higher than the aforementioned alternative sources of localized heating, which typically have efficiencies less than one percent. The highly efficient optical energy generated by the optical energy generating subsystem 14 may be directed at areas ahead of the tool (relative to its direction of movement), thus heating the materials M1/M2, and more specifically the joint area 15 of the materials M1/M2, to a temperature which is close to the softening temperature of the materials M1/M21. The diode array of the optical energy generating subsystem 14 can also be used to heat joint areas both in front of and behind the tool 12, relative to the direction of movement of the tool 12, to thus perform both a pre-processing and a post-processing of the materials M1/M2 being worked on by the tool 12. Furthermore, the heating profile generated by the diode array 14b of the optical energy generating subsystem 14 can be controlled electronically, through suitable electrical signals used to illuminate the laser diode bars 14a of the diode array 14b, as well as through the use of one or more lenses.

During use of the system 10, the dwell time required to heat the materials M1 and M2 at the joint area 15, ahead of the advancing tool 12, must be sufficiently long to raise the temperature of the materials to the softening point. Simply for purposes of discussion, it will be assumed that the materials M1 and M2 are metals. When raising the metals M1/M2 to the softening point, one must also account for losses due to thermal conduction in the sheet away from the irradiated area. It can be shown that this dwell time (t) for slab heating is approximately ($t=k/a^2$), where (k) is the thermal conductivity of the metal being heated and (a) is the length of one side of the illuminated area, which is assumed to be square. The velocity of the optical energy generating subsystem 14 (i.e.; the light source) (u) is then (u=a/t).

During the dwell time (t), the heat generated is also diffused in lateral directions. The power required to heat the metals to their softening temperature, $T_S$, is the "absorbed" power. The absorbed power may be expressed as: $P \approx pC_p T_s 3a^2 U \sim pC_p T_s 3aD$. For an aluminum plate with a thickness of approximately one centimeter (1 cm) and a softening temperature $T_S$ of four-hundred degrees Centigrade ($T_s \approx 400°$ C.), the required power is about three kilowatts ($P \approx 3$ kW) and the scanning speed is about one centimeter per second (u≈1 cm/sec). For a high strength steel of the same thickness, with a softening temperature $T_S$ of nine-hundred degrees Centigrade ($T_s \approx 900°$ C.), the required power is about two kilowatts ($P \approx 2.2$ kW), and the scanning speed about 2 millimeters per second (u≈0.2 cm/sec). Thus, the power source required is a relatively powerful one, but the above parameters are still achievable using modern industrial lasers. A significant drawback, however, is that modern lasers are often complex and expensive devices. But because tight focusing of the optical beam from the diode array 14b is typically not needed, the use of one or more diode arrays is sufficient to provide the needed amount of optical energy. In one form the diode array may be modified to provide duct transported energy to the target to achieve the softening temperature $T_S$. By "duct transported energy", it is meant optical energy that is directed through at least one microlens (e.g., quartz, clear glass or other material) that somewhat focuses the optical energy in a desired pattern, such as a circular or hemispherical pattern, on the material surface. The laser diode bars 14a have the added advantage of having an electrical-to-optical efficiency of at least approximately fifty percent or better, and the ducts can help to transfer roughly over 90% of the light from the diode array 14b to the target. As a result, the system 10, and particularly the diode array 14b of the optical energy generating subsystem 14, can be made highly compact, with highly efficient delivery of the optical energy to the target.

As another example, intense diode arrays with microlenses and microchannel heat exchangers can be used for heating. These diode arrays can be placed in front of the advancing tool, beneath the advancing tool thus heating the work piece from the side opposite the FSW or FSP tool, or even behind the advancing tool to control the cooling rate, and any associated grain growth or recrystallization. Of course, diode-pumped lasers and other forms of lasers could be implemented as well as direct diode arrays, but it is anticipated that the use of a diode array may be especially desirable from a cost standpoint.

It will also be appreciated that the light reflection from metals, especially aluminum, can be high, which under some circumstances may decrease the efficiency of the optical energy generating subsystem 14 in delivering the optical energy to the materials M1/M2. One possible solution to address this drawback is to apply a light absorbing paint or coating to the materials M1/M2 to provide substantial, or virtually complete, light absorption. Since the system 10 does not heat the materials M1/M2 up to the melting temperature, the possibility of paint removal is not a concern. Also, the FSW process is known to be insensitive to various impurities, and the presence of paint on the surfaces of the materials M1/M2 will not appreciably affect the quality of the weld joint that the system 10 forms. To further reduce the required degree of optical energy needed to be generated by the diode array 14b, the opposing surfaces of the materials M1/M2 could be illuminated by separate diode arrays 14b positioned on opposing sides of the materials M1/M2. In this manner the opposing diode arrays could heat the same area of the materials being joined, but from different sides of the materials, as the FSW or FSP operation is performed.

Figure 2:
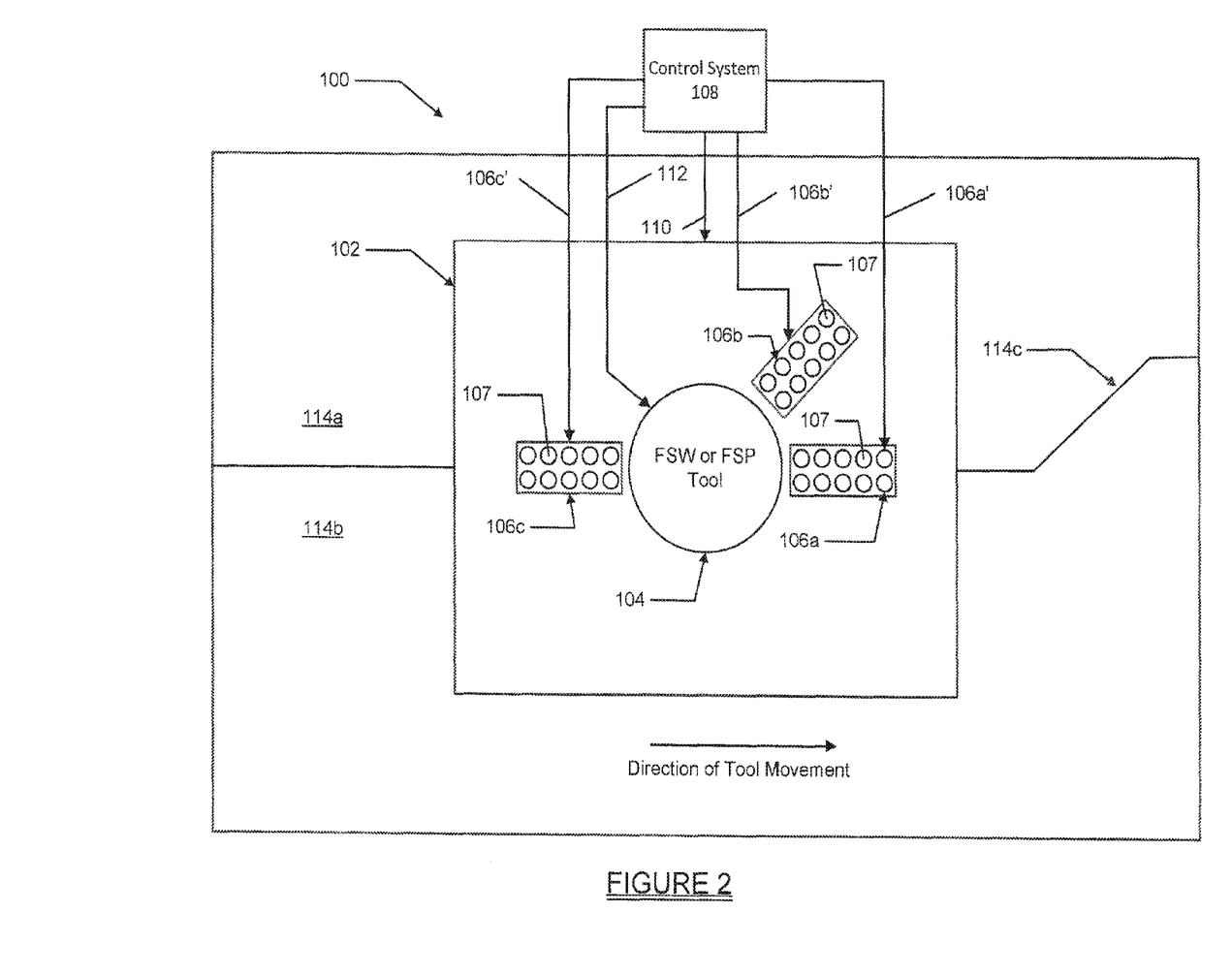
FIG. 2 is a high level plan diagram of another embodiment of the present disclosure involving a plurality of optical energy generating subsystems that are selectively activated as needed as a FSW or FSP tool is moved about a complex, non-linear path, to at least one of pre-soften or thermally post process, the joint area as the tool moves along the joint area.

Referring briefly to FIG. 2, a system 100 in accordance with another embodiment of the present disclosure is shown. The system 100 is similar to the system 10 but includes a moveable frame-like structure 102 that supports a rotatable FSW or FSP tool 104. However, in this embodiment the optical energy generating subsystem consists of a plurality of laser diode arrays 106a, 106b, and 106c, each having a plurality of laser diode bars 107. Again, while only 10 laser diode bars 107 are illustrated in each diode array 106a, 106b, 106c, in an actual system typically dozens to possibly several thousand laser diode bars may be included in each array 106a, 106b, 106c.

The laser diode arrays 106a, 106b, 106c may be controlled independently via suitable signals over lines 106a', 106b' and 106c', respectively, by a control system 108. Circuit lines 110 and 112 also enable the control system 108 to control movement of the frame-like structure 102 and the FSW (or FSP) tool 104 independently of one another. The use of diode array 106c enables a non-linear joint line, such as joint line 14c, to be followed more closely and potentially heated even more effectively than what would be possible with only laser diode array 106a. In this regard it will be appreciated that the control system 108 could potentially also be configured to selectively turn on and off certain ones of the laser diode arrays 106a-106c as needed during an FSW or FSP operation. Such action could help to more effectively and/or efficiently execute a FSW or FSP joining/processing operation along a non-linear joint line. Still further, one or more of the laser diode arrays 106a, 106b and 106c could be located on an independently moveable platform to enable it to be moved independent of the frame-like structure 102, and thus independent of other ones of the laser diode arrays, while executing a FSW or FSP operation. This could provide even further flexibility in controllably preheating and pre-softening, or even post-heating, selected portions of the joint line 114c during a FSW or FSP operation.

Figure 3:
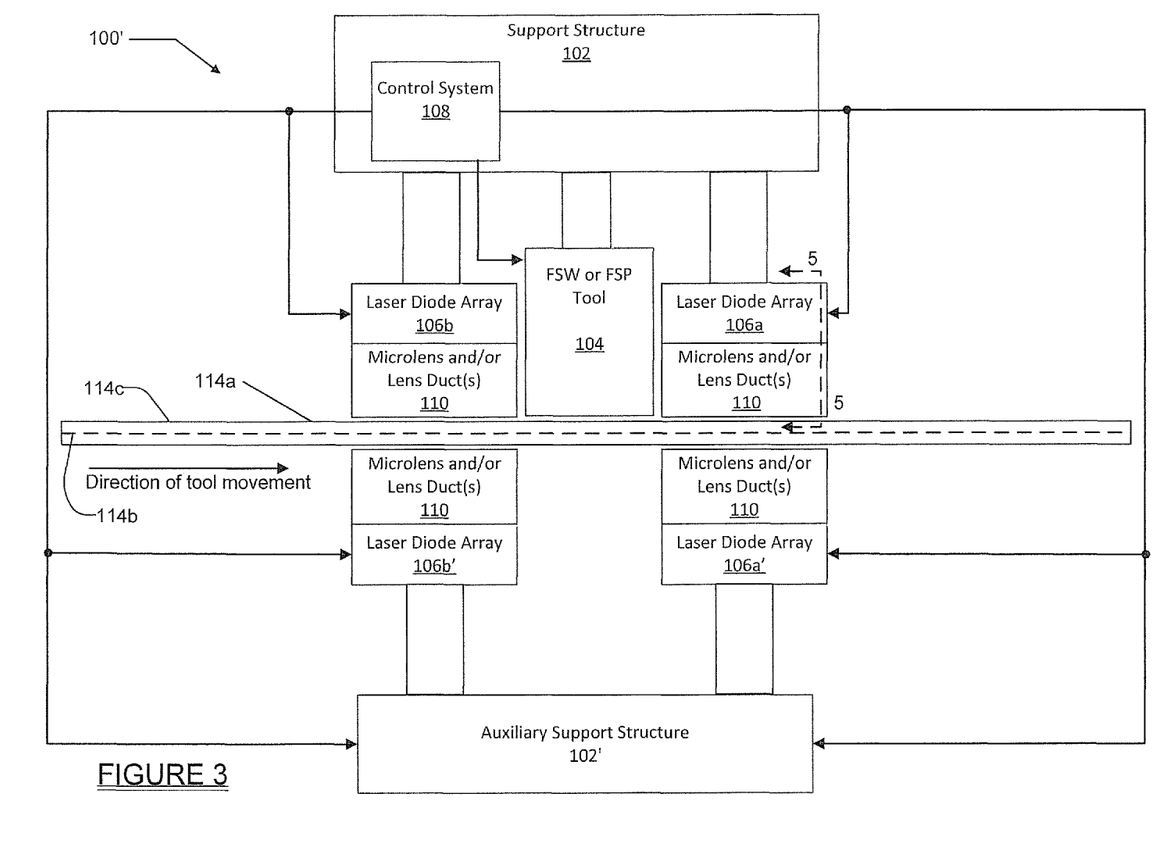
FIG. 3 is a high level side view of an alternative system in which diode arrays are disposed adjacent the opposing surfaces of the materials, to thus enable simultaneous pre-heating or post-heating of the opposing surfaces of the materials.

FIG. 3 shows yet another alternative embodiment 100' to the system 100 in which two groups of the laser diode arrays 106a, 106b are arranged on opposite sides of the FSW (or FSP) tool 104. Laser diode arrays 106a' and 106b' are supported by suitable auxiliary support structure 102' that is moved concurrently with support structure 102, and have their energization controlled by the control system 108 so that all four laser diode arrays 106a, 106a', 106b, 106b' are energized simultaneously. This enables both pre-heating and post-heating of the materials 114a and 114b along the joint line 114c from both of the opposing surfaces of the materials 114a/114b. In this example each of the laser diode arrays 106a, 106a', 106b, 106b' also include microlenses and/or one or more lens ducts or simple condensing lenses 110. If component 110 forms a lens duct, it may be made from quartz, clear glass or any other suitable material, or a hollow reflective structure known as a hollow lens duct (see Marc Eichhorn, "Theory and eOptimization of Hollow Ducts," Appl. Opt. 47, 1740-1744 (2008)) to provide duct transported optical energy to the materials 114a/114b. It will be appreciated that the microlenses 110 could be incorporated into the embodiments shown in FIGS. 1 and 2 as well. Alternatively, a plurality of lens ducts or condensing may be used with each diode array.

Figure 4:
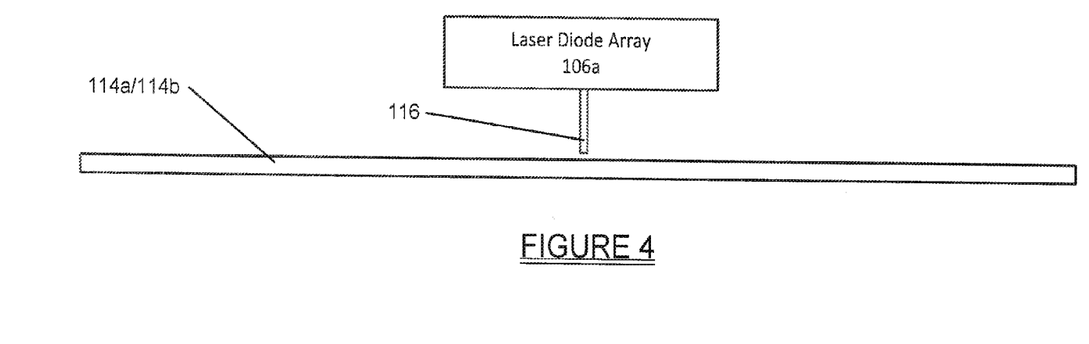

With brief reference to FIG. 4, another specific laser diode array configuration is shown that is particularly suitable for use with the present disclosure. This configuration involves using direct fiber coupled laser diode arrays which are now becoming available in systems approaching 1 kW. A highly simplified illustration of this configuration is shown in FIG. 4, which illustrates the laser diode array 106a of FIG. 3 using a direct coupled, flexible fiber optic element 116 to deliver its optical output to the surface of materials 114a/114b. Such diode arrays conveniently deliver their output power over flexible optical fibers (see Robin K. Huang*, Bien Chann, John D. Glenn, "Ultra-High Brightness, Wavelength-Stabilized, kW-Class Fiber Coupled Diode Laser", Proc. of SPIE Vol. 7918 791810-1). For example, TeraDrive Inc, has recently announced their CNO-450-100 unit which delivers up to 450 W using a spectral beam combining method to couple extended diode arrays into an optical fiber. It will be appreciated that the use of laser diode arrays with the direct coupled, flexible fiber optic element 116 shown in FIG. 4 could also be implemented in various orientations, such as both ahead of and behind the tool 104 and/or on opposing sides of the materials 114a/114b as described in connection with the drawing of FIG. 3.

Figure 5:
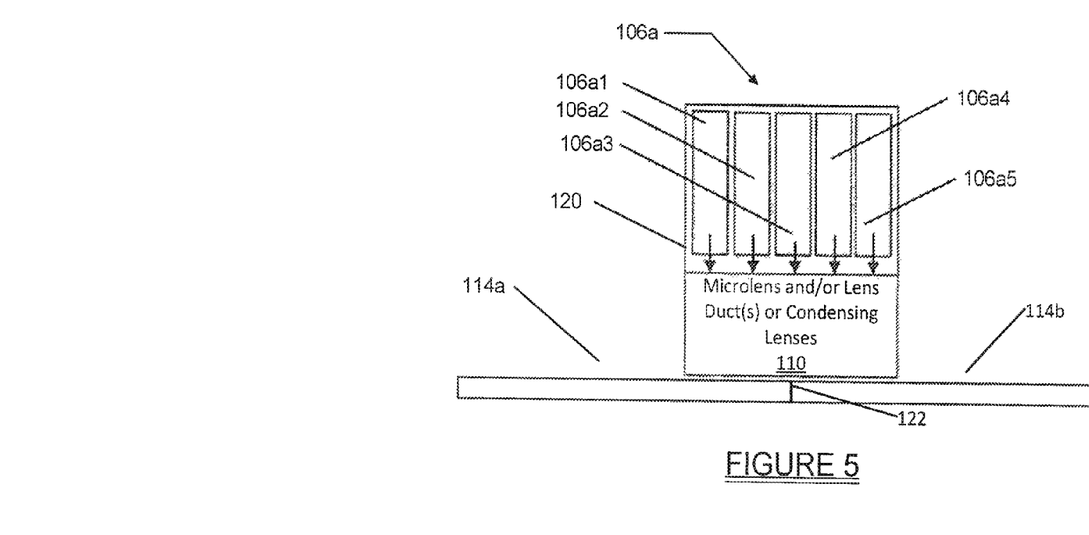
FIG. 5 is a highly simplified sectional drawing taken along section line 5-5 in FIG. 3 illustrating one possible configuration for positioning the diode bars closely adjacent one another to form the laser diode array.

With brief reference to FIG. 5, one example is shown as to how a plurality of diode bars 106a1-106a5 could be positioned closely adjacent one another to form the laser diode array 106a. In this example the diode bars 106a1-106a5 are contained within a suitable housing 120 and arranged generally parallel to one another, and also to a joint line 122 of materials 114a/114b. Of course, the diode bars 106a1-106a5 could be arranged relative to one another in virtually any other desired configuration as required by a specific application. Still further, while five diode bars 106a1-106a5 are shown, it will be appreciated that a greater or smaller number of diode bars could be implemented depending on the needs of the specific application.

Still further, it will be appreciated that the optical energy generating subsystem 14 may comprise a laser used with methods for defocusing and/or rastering the laser. The optical generating subsystem 14 may also be used in combination with another heating method, such as localized induction heating or ohmic heating.

The present system 10 and its methodology of operation provide a number of highly important benefits. For one, the pre-heating and softening of the material at the material joint greatly reduces the load on the FSW or FSP tool, as well as the wear rate thereof. This can significantly extend tool life and reduce processing costs. The pre-heating and softening of the material also enables the tool to traverse the material more rapidly, thereby increasing the rate of processing, which also contributes to reduced processing costs. By controlling the heating of the weld zone, the number of defects associated with non-uniform and insufficient heating by the stir tool, such as the formation of tunnel-type voids, will be significantly reduced or possibly even eliminated in its entirety. Still further, the exit hole remaining after retraction of the stir tool, and the defects related to this extraction, are well known drawbacks of FSW and FSP. These drawbacks may be mitigated, or even possibly eliminated in their entirety, with additional heating of the exit point using one or more of the laser diode arrays 14b or 106. Using optical energy for pre-heating and pre-softening the material may also enable the application of FSP and FSW to a broader range of materials such as, for example, refractory metals and alloys, cermets, ceramics, polymers and plastics. Finally, the optical energy generated by the laser diode array 14b and 106 can be used for thermal post processing, such as annealing the stir zone ("SZ"), the thermo-mechanically affected zone ("TMAZ") and the heat affected zone ("HAZ") of the materials being worked on. This can help relax residual tensile stresses and reduce the chance of stress corrosion cracking and corrosion fatigue in these regions.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus for use in a friction stir operation, including FSW and FSP, comprising:
    a control subsystem;
    a rotating tool adapted to be plunged into a material susceptible to being softened by heating with light, the rotating tool further adapted to be advanced along a surface of the material by the control subsystem;
    an optical energy generating subsystem controlled by the control subsystem and supported adjacent the surface of the material, and controlled to heat, using optical energy, a portion of the material as the tool is advanced along the material;
    wherein the optical energy generating subsystem includes first and second laser diode arrays individually controlled by the control subsystem; and
    wherein the laser diode arrays are selectively arranged adjacent to the rotating tool, and laterally offset from one another relative to a path of travel of the rotating tool, to perform at least one of pre-heating and post-heating along a non-straight joint line of two portions of the material being joined.

2. The apparatus of claim 1, wherein the heating of the portion of the material effects a pre-softening of the material prior to the material being acted on by the rotating tool.

3. The apparatus of claim 1, wherein the heating of the portion of the material effects a thermal post processing of the material after the material has been acted on by the rotating tool.

4. The apparatus of claim 1, wherein the friction stir operation comprises at least one of a friction stir welding (FSW) and a friction stir processing (FSP) operation.

5. The apparatus of claim 1, wherein each of the laser diode arrays of the optical energy generating subsystem comprise at least one laser diode bar.

6. The apparatus of claim 1, wherein each of the laser diode arrays comprises a plurality of laser diode bars.

7. The apparatus of claim 1, wherein the optical energy generating subsystem is operated in accordance with at least one of a defocusing or a rastering method.

8. The apparatus of claim 1, wherein the optical energy generating subsystem is used in combination with at least one of localized induction heating or ohmic heating.

9. The apparatus of claim 1, wherein the control subsystem selectively controls energization of the laser diode arrays to selectively turn on and off ones of the laser diode arrays when the rotating tool is being moved along a non-straight path.

10. The apparatus of claim 1, wherein the material that the friction stir operation is performed on comprises at least one of:
 a metal;
 a metallic alloy;
 a ceramic;
 a glass;
 a plastic; and
 combinations thereof.

11. The apparatus of claim 1, wherein the optical energy generating subsystem comprises a direct fiber-coupled diode array.

12. The apparatus of claim 1, wherein the optical energy generating subsystem comprises a plurality of direct fiber-coupled diode arrays.

13. The apparatus of claim 12, wherein the direct fiber-coupled diode arrays are selectively arranged adjacent to the rotating tool to perform at least one of pre-heating and post-heating along a joint line of two portions of the material being joined.

14. The apparatus of claim 1, wherein:
 each of the laser diode arrays of the optical energy generating subsystem comprises a plurality of laser diode bars forming a diode array; and
 further comprising a lens duct or condensing lens arranged to collect and condense an optical output from the laser diode bars prior to delivering the optical output to the material.

15. The apparatus of claim 14, wherein the laser diode arrays each deliver an optical output to at least one of:
 a lens duct or condensing lens; or
 multiple lens ducts or condensing lenses;
 to further collect and condense the optical output before delivery to the material.

16. An apparatus for use in at least one of a friction stir welding (FSW) and a friction stir processing (FSP) operation, comprising:
 a rotating tool adapted to be plunged into a material susceptible to being softened by heating, the rotating tool further adapted to be advanced along a surface of the material;
 a plurality of diode arrays arranged so as to be laterally offset from one another relative to a path of travel of the rotating tool, each said diode array having at least one light emitting diode, the diode array being supported from the apparatus adjacent the surface of the material and adjacent the rotating tool, and the diode array further being controlled to optically heat a portion of the material using optical energy at least one of prior to, or subsequent to, the material being acted on by the rotating tool; and
 the diode arrays being selectively energizable depending on a path of travel of rotating tool to enable a non-straight path of travel of the rotating tool to be at least one of pre-heated or post-heated.

17. The apparatus of claim 16, wherein the material that the friction stir operation is performed on comprises at least one of:
 a metal;
 a metallic alloy;
 a ceramic;
 a glass;
 a plastic; and
 combinations thereof.

18. The apparatus of claim 16, further including an additional diode array, and wherein the plurality of diode arrays and the additional diode array are located on opposite sides of the rotating tool, relative to a direction of movement of the rotating tool.

19. The apparatus of claim 16, wherein each said diode array comprises a plurality of laser diode bars supported adjacent one another and energized simultaneously.

20. The apparatus of claim 16, further comprising a microlens disposed adjacent each said diode array for providing the optical energy in a duct transported manner to the surface of the material.

21. An apparatus for use in a friction stir operation, including FSW and FSP, comprising:
 a control subsystem;
 a rotating tool adapted to be plunged into a material susceptible to being softened by heating with light, the rotating tool further adapted to be advanced along a surface of the material by the control subsystem;
 an optical energy generating subsystem controlled by the control subsystem and supported adjacent the surface of the material, and controlled to heat, using optical energy, a portion of the material as the rotating tool is advanced along the material;
 wherein the optical energy generating subsystem includes first and second laser diode arrays individually controlled by the control subsystem; and
 wherein the first and second laser diode arrays are selectively arranged relative to a path of travel of the rotating tool, to perform at least one of pre-heating and post-heating along a non-straight joint line of two portions of the material being joined.

* * * * *